United States Patent
Minamiura et al.

(10) Patent No.: US 9,840,127 B2
(45) Date of Patent: Dec. 12, 2017

(54) TEMPERATURE REGULATION SYSTEM AND METHOD FOR ESTIMATING FOREIGN MATTER CLOGGING AMOUNT

(71) Applicants: Keiichi Minamiura, Nagoya (JP); Kimihito Nakamura, Toyota (JP); Toyotaka Maeda, Nagoya (JP); Yoshiaki Kikuchi, Toyota (JP)

(72) Inventors: Keiichi Minamiura, Nagoya (JP); Kimihito Nakamura, Toyota (JP); Toyotaka Maeda, Nagoya (JP); Yoshiaki Kikuchi, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 388 days.

(21) Appl. No.: 14/412,263

(22) PCT Filed: Oct. 1, 2013

(86) PCT No.: PCT/IB2013/002177
§ 371 (c)(1),
(2) Date: Dec. 31, 2014

(87) PCT Pub. No.: WO2014/053900
PCT Pub. Date: Apr. 10, 2014

(65) Prior Publication Data
US 2015/0333380 A1 Nov. 19, 2015

(30) Foreign Application Priority Data
Oct. 2, 2012 (JP) ................................. 2012-220370

(51) Int. Cl.
*B60R 16/04* (2006.01)
*B60H 1/00* (2006.01)
(Continued)

(52) U.S. Cl.
CPC .......... *B60H 1/00278* (2013.01); *G01F 1/05* (2013.01); *H01M 10/625* (2015.04);
(Continued)

(58) Field of Classification Search
CPC ................ B60H 1/00278; B60H 1/004; B60H 1/00821; B60H 1/00642; B60H 1/00849;
(Continued)

(56) References Cited

U.S. PATENT DOCUMENTS 6,283,849 B1 * 9/2001 Shields ................ B60H 3/0608
454/158
6,373,228 B1 * 4/2002 Sakakibara ........... H02J 7/0042
320/150
(Continued)

FOREIGN PATENT DOCUMENTS

CN 100500466 C 6/2009
EP 1 459 921 A1 9/2004
(Continued)

OTHER PUBLICATIONS

International Search Report for corresponding International Patent Application No. PCT/IB2013/002177 dated Apr. 1, 2014.

*Primary Examiner* — James M Dolak
(74) *Attorney, Agent, or Firm* — Sughrue Mion, PLLC

(57) ABSTRACT

A temperature regulation system includes: an electric storage device, installed in a vehicle and configured to perform charge and discharge; an intake duct that leads air of a vehicle interior to the electric storage device; a fan configured to cause the air to be taken into the intake duct; a filter that is provided inside the intake duct and that prevents passage of foreign matter; and a controller that estimates a clogging amount of the foreign matter on the filter. The controller is configured to increase the estimated clogging amount as there increases a total amount of the air that is
(Continued)

supplied to the electric storage device accompanying driving of the fan, and the number of times that the vehicle is brought to a state in which air is allowed to flow into and flow out of the vehicle.

8 Claims, 5 Drawing Sheets

(51) Int. Cl.
    *G01F 1/05*     (2006.01)
    *H01M 10/625*     (2014.01)
    *B60H 3/06*     (2006.01)

(52) U.S. Cl.
    CPC ............... *B60H 2001/003* (2013.01); *B60H 2003/0683* (2013.01); *H01M 2220/20* (2013.01)

(58) Field of Classification Search
    CPC ........... B60H 1/00271; B60H 1/00385; B60H 1/00392; B60H 3/06; B60H 3/0633; B60H 3/0608; B60H 2003/0683; B60H 2001/003; G01F 1/05; H01M 10/625; H01M 10/60; H01M 10/63; H01M 10/61; H01M 10/613; H01M 10/6563; H01M 10/66; H01M 10/663; H01M 10/486; H01M 2220/20; B60L 11/187; B60L 11/1874; B60K 11/00; B60K 11/06; B60K 11/08
    See application file for complete search history.

(56) References Cited

U.S. PATENT DOCUMENTS

| | | | | |
|---|---|---|---|---|
| 6,582,295 | B1 * | 6/2003 | Abouchaar | B01D 46/0039 340/607 |
| 6,662,891 | B2 * | 12/2003 | Misu | B60K 1/04 180/65.1 |
| 7,143,724 | B2 * | 12/2006 | Hashizumi | H01M 10/486 123/41.56 |
| 7,451,608 | B2 * | 11/2008 | Kikuchi | B60H 1/00278 62/186 |
| 7,923,141 | B2 * | 4/2011 | Okuda | B60L 3/0046 429/120 |
| 8,084,156 | B2 * | 12/2011 | Okuda | B60L 3/0046 180/65.1 |
| 8,150,570 | B2 * | 4/2012 | Yoon | B60H 1/00278 320/152 |
| 8,182,579 | B2 * | 5/2012 | Woo | B01D 46/0086 318/461 |
| 9,120,366 | B2 * | 9/2015 | Hoke | B60H 3/0616 |
| 9,487,077 | B2 * | 11/2016 | Tsuchiya | B60K 1/04 |
| 9,608,280 | B2 * | 3/2017 | Kinoshita | H01M 10/486 |
| 9,620,827 | B2 * | 4/2017 | Houchin-Miller | H01M 2/1094 |
| 9,660,303 | B2 * | 5/2017 | Wolf | H01M 10/486 |
| 2006/0172188 | A1 | 8/2006 | Okuda et al. | |
| 2008/0014853 | A1 * | 1/2008 | Kim | B60H 1/00764 454/86 |
| 2009/0234532 | A1 | 9/2009 | Yoon et al. | |

FOREIGN PATENT DOCUMENTS

| | | |
|---|---|---|
| JP | 09-267646 A | 10/1997 |
| JP | 2001-120934 A | 5/2001 |
| JP | 2001-136676 A | 5/2001 |
| JP | 2005-293971 A | 10/2005 |
| JP | 2006-210190 A | 8/2006 |
| JP | 2012-006476 A | 1/2012 |

* cited by examiner

TEMPERATURE REGULATION SYSTEM AND METHOD FOR ESTIMATING FOREIGN MATTER CLOGGING AMOUNT

BACKGROUND OF THE INVENTION

1. Field of the Invention

The invention relates to a technology for estimating a dust clogging amount on a filter that is used in a system that regulates the temperature of an electric storage device.

2. Description of Related Art

There is a technique in which a battery is cooled through supply of cooling air to the battery. In systems where cooling air is supplied to a battery, a filter may be provided in order to remove foreign matter that might be supplied to the battery along with the cooling air. If a filter is provided, it is necessary to grasp the clogging state of the foreign matter on the filter.

For example, Japanese Patent Application Publication No. 09-267646 (JP 09-267646 A) discloses the feature of determining the occurrence of clogging on an intake side or discharge side, on the basis of a number of revolutions of an intake fan and a discharge fan. Japanese Patent Application Publication No. 2001-136676 (JP 2001-136676 A) discloses the feature of measuring the temperature of a battery, and determining that clogging has occurred in an airflow passage when the measured temperature of the battery is higher than the expected temperature upon cooling of the battery.

SUMMARY OF THE INVENTION

In the invention, clogging of foreign matter on a filter is estimated by resorting to a means different from those in JP 09-267646 A and JP 2001-136676 A.

In a first aspect of the invention, a temperature regulation system includes an electric storage device, an intake duct, a fan, a filter and a controller. The electric storage device is installed in a vehicle and is configured to perform charge and discharge. The intake duct leads air of a vehicle interior to the electric storage device. The fan is configured to cause the air to be taken into the intake duct. The filter is provided inside the intake duct, and traps foreign matter. The controller is configured to estimate a clogging amount of the foreign matter on the filter. The controller is configured to increase the estimated clogging amount as there increases a total amount of the air that is supplied to the electric storage device accompanying driving of the fan, and the number of times that the vehicle is brought to a state in which air is allowed to flow into and flow out of the vehicle.

Foreign matter is taken more readily into the intake duct, along with air, as there increases the amount of the air supplied to the electric storage device. The foreign matter that is taken into the intake duct is trapped by the filter. Accordingly, the amount of foreign matter that is trapped by the filter is increased as there increases the amount of the air supplied to the electric storage device. Therefore, the estimated clogging amount of foreign matter on the filter is increased as there increases the total amount of air that is supplied to the electric storage device.

The greater the extent to which air is allowed to flow into and flow out of the vehicle, the more readily foreign matter swirls in the vehicle interior and is taken into the intake duct. In the above configuration, the estimated clogging amount of foreign matter is increased as there increases the number of times that the vehicle is brought to the state in which air is allowed to flow into and flow out of the vehicle. In the first aspect of this application, thus, the clogging amount of foreign matter on the filter is grasped more readily by taking into consideration not only the amount of the air supplied to the electric storage device, but also the number of times that the vehicle is brought to the state in which air is allowed to flow into and flow out of the vehicle.

In the temperature regulation system, the controller may calculate a total amount of the air by integrating the amount of the air supplied to the electric storage device over the time that the fan is driven.

Clogging of the filter with foreign matter may arise from the point in time at which the fan is driven for the first time. In order to grasp the clogging amount of foreign matter on the filter, it is therefore desirable to grasp the amount of air that is supplied to the electric storage device over the lapse of time since the fan is driven for the first time up to the present. In the above configuration, there is calculated the supply amount of air during driving of the fan, such that the supply amount of air can be integrated whenever the fan is driven, upon repeated start and stop of fan driving (intermittent driving).

In the temperature regulation system, the number of times that the vehicle is brought to the state in which air is allowed to flow into and flow out of the vehicle, may be the number of times that a door of the vehicle is opened and closed.

There is a high likelihood that an occupant boards or leaves the vehicle when a door of the vehicle is opened or closed. Foreign matter swirls readily in the vehicle interior when an occupant boards or leaves the vehicle. The above configuration allows grasping the boarding frequency of an occupant by grasping the number of times that a door is opened and closed. It becomes possible to grasp as a result situations in which foreign matter is taken into the intake duct. A situation wherein foreign matter is taken into the intake duct can be grasped by prescribing the estimated clogging amount of foreign matter on the filter to increase as there increases the number of times that the door is opened and closed.

In the temperature regulation system, the number of times that the vehicle is brought to the state in which air is allowed to flow into and flow out of the vehicle, may be the number of times that a window of the vehicle is opened and closed.

Foreign matter is likelier to swirl in the vehicle interior when a window of the vehicle is opened. In particular air (running wind) intrudes more readily from the vehicle exterior into the vehicle interior, and foreign matter swirls more readily, when the vehicle is traveling with an open window. The above configuration allows grasping a situation in which foreign matter is taken into the intake duct, by grasping the number of times that a window is opened and closed. A situation wherein foreign matter is taken into the intake duct can be grasped by prescribing the estimated clogging amount of foreign matter on the filter to increase as there increases the number of times that the window is opened and closed.

In the temperature regulation system, the controller may calculate the estimated clogging amount by multiplying the total amount of the air by a coefficient and the coefficient may vary depending on the position of the intake port in the vehicle interior.

The swirling state of foreign matter, and the likelihood of foreign matter being taken into the intake port, may vary depending on the position of the intake port. Therefore, the above configuration allows estimating the clogging amount by taking into consideration the likelihood of foreign matter being taken in, by using a coefficient that varies depending on the position of the intake port.

The temperature regulation system may further includes an information output unit configured to output information indicating that the filter is clogged with the foreign matter. The controller drives the information output unit when the clogging amount is equal to or greater than a threshold value.

The above configuration allows determining that a filter is clogged with foreign matter when the clogging amount is equal to or greater than a threshold value. The threshold value can be appropriately set taking into consideration the temperature regulation ability of the electric storage device that utilizes air. As the filter becomes clogged with foreign matter, air is supplied less readily to the electric storage device, and the temperature regulation ability of the electric storage device may drop. The threshold value may be set to lie within a range such that the temperature regulation ability of the electric storage device can be maintained. Clogging by foreign matter can be grasped at an early stage, before a drop in the temperature regulation ability, depending on the setting of the threshold value.

In a second aspect of the invention, a method for estimating a foreign matter clogging amount includes leading air in a vehicle, through driving of a fan, to an electric storage device via an intake duct in which a filter is disposed; estimating a clogging amount of foreign matter on the filter; and increasing the estimated clogging amount as there increases a total amount of the air that is supplied to the electric storage device and the number of times that the vehicle is brought to a state in which air is allowed to flow into and flow out of the vehicle.

The second aspect can elicit effects identical to those of the first aspect.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the invention are explained next.

Figure 1:
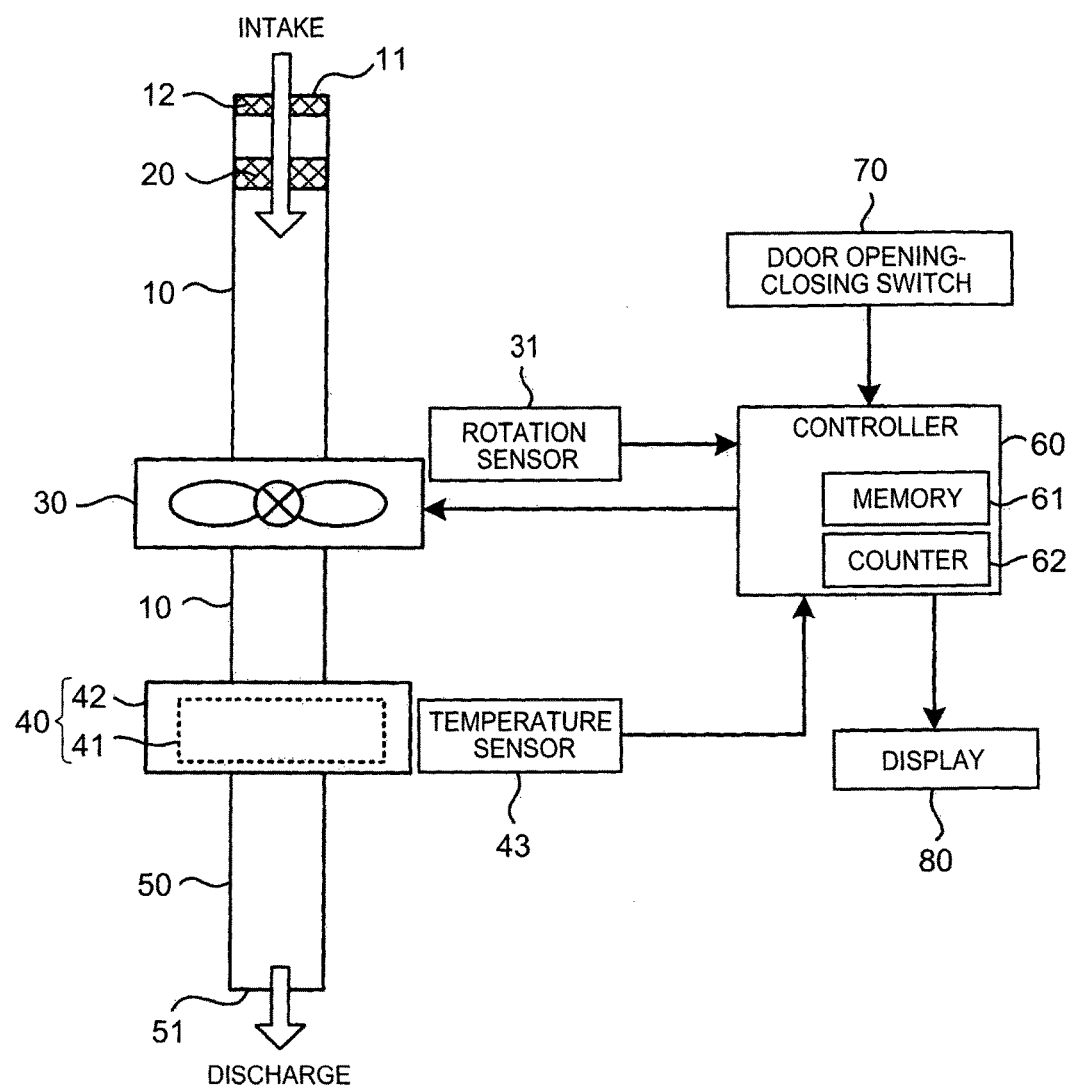
FIG. 1 is a schematic diagram illustrating a configuration for regulation of the temperature of a battery pack, according to an embodiment of the invention.

A temperature regulation system of an embodiment will be explained next with reference to FIG. 1. Herein, FIG. 1 is a schematic diagram illustrating the configuration of a temperature regulation system. The temperature regulation system illustrated in FIG. 1 is installed in a vehicle. The vehicle is a hybrid automobile or an electric automobile.

A hybrid automobile is provided with a below-described battery pack, and with another motive power source such as an engine or fuel cell, as motive power sources for enabling the vehicle to travel. An electric automobile is provided with a below-described battery pack alone, as a motive power source for enabling the vehicle to travel.

In FIG. 1, an intake duct 10 has an intake port 11 for taking in air that is used for temperature regulation of a battery pack. The intake port 11 is exposed in a vehicle cabin (corresponding to a vehicle interior). Air that is present in the vehicle cabin is taken into the intake port 11. The vehicle cabin denotes herein a space that is boarded by an occupant. Air in the vehicle cabin is regulated, by an air conditioning system that is installed in the vehicle, to a temperature that is appropriate for temperature regulation of the battery pack. Accordingly, the temperature of the battery pack can be regulated through supply, to the battery pack, of air from the vehicle cabin.

A bezel 12 is provided in the intake port 11 of the intake duct 10. The bezel 12 has also the function of suppressing intrusion of foreign matter into the intake duct 10 through the intake port 11. For example, the bezel 12 is formed to a grid-like shape. A filter 20 is provided inside the intake duct 10.

The filter 20, which has a reticular structure, traps dust (corresponding to foreign matter) that passes through the intake duct 10. That is, air that enters the intake duct 10 through the intake port 11 passes through the filter 20, but dust that enters into the intake duct 10 through the intake port 11 becomes adhered to the filter 20. Herein, dust includes for example lint that is shed off clothing or the like of occupants.

The filter 20 is likelier to clog up when lint or the like becomes adhered to the filter 20. When the filter 20 clogs up, the dust is likelier to adhere to the filter 20. For example, the dust that is small enough to pass through a not clogged filter may adhere to the filter 20 when the filter 20 is clogged. Thus, this exacerbates clogging of the filter 20.

In the present embodiment, the filter 20 is provided in the vicinity of the bezel 12. The filter 20 can be removed thus, through the intake port 11, by just removing the bezel 12. That is, the filter 20 is removed when dust has accumulated in the filter 20, whereupon the dust adhered to the filter 20 can be removed, or the filter 20 may be replaced with a new filter 20 having no dust adhered thereto.

The position at which the filter 20 is provided is not limited to the position illustrated in FIG. 1. That is, the position at which the filter 20 is provided may be set arbitrarily, so long as dust that moves through the intake duct 10 can be adhered to the filter 20. The filter 20 may be provided at any position inside the intake duct 10, in order to inhibit dust from reaching a below-described battery pack 40. In order to inhibit dust from adhering to a below-described fan 30, the filter 20 is preferably disposed in a region that is positioned closer to the intake port 11 than to the fan 30.

The fan 30 is connected to the intake duct 10. The fan 30 operates upon reception of a driving signal from a controller 60. Through rotation of the fan 30, air that is present in the vehicle cabin is taken into the intake duct 10, through the intake port 11. The air that passes through the fan 30 traverses the intake duct 10 and is led to the battery pack 40.

The battery pack 40 has an assembled battery (can be regarded as an electric storage device) 41 and a case 42 that houses the assembled battery 41. The intake duct 10 is connected to the case 42, such that air that passes through the intake duct 10 is introduced into the case 42. The assembled battery 41 is housed in the case 42, and hence air that is introduced into the case 42 comes into contact with the assembled battery 41.

The assembled battery 41 has a plurality of unit cells that are electrically connected in series. Secondary batteries such as nickel hydride batteries or lithium ion batteries can be used as the unit cells. Electric double layer capacitors can be used instead of secondary batteries. In the present embodiment, all the unit cells that make up the assembled battery 41 are electrically connected in series, but the battery is not limited thereto. For example, the assembled battery 41 may have a plurality of unit cells that are electrically connected in parallel.

A so-called square battery or a so-called cylindrical battery can be used as each unit cell. That is, the external form of the unit cells can be selected as appropriate. The pathway along which air moves inside the case 42 can be set as appropriate. That is, it suffices that air can be led efficiently to each unit cell that makes up the assembled battery 41. The motion pathway of air inside the case 42 can be set in consideration of the external form of the unit cell.

The assembled battery 41 is used as a motive power source for enabling the vehicle to travel. Specifically, the electrical energy outputted by the assembled battery 41 is converted, by a motor-generator, to kinetic energy for enabling the vehicle to travel. That is, vehicle can travel by transmission of the kinetic energy that is generated by the motor-generator to the vehicle wheels.

Upon deceleration or stoppage of the vehicle, by contrast, the motor-generator converts to electrical energy the kinetic energy that is generated during braking of the vehicle, and outputs this electrical energy to the assembled battery 41. As a result, regenerative power can be stored in the assembled battery 41.

A booster circuit and an inverter can be disposed in the current pathway between the assembled battery 41 and the motor-generator. The output voltage of the assembled battery 41 can be boosted if a booster circuit is provided. Further, a three-phase AC motor can be used as the motor-generator if an inverter is provided.

The temperature of the assembled battery 41 (unit cells) may rise on account of charge and discharge, and due to the influence of the external environment. In this case, rises in the temperature of the assembled battery 41 (unit cells) can be suppressed by supplying air from the vehicle cabin to the assembled battery 41, via the intake duct 10. In an environment such that the temperature of the assembled battery 41 rises, it is likely that, on account of the air conditioning system for example, the temperature of the air in the vehicle cabin is at a lower temperature than the temperature of the assembled battery 41. Accordingly, rises in the temperature of the assembled battery 41 can be suppressed by supplying air from the vehicle cabin to the assembled battery 41.

By contrast, the temperature of the assembled battery 41 (unit cells) may drop on account of, for example, the influence of the external environment. In this case, drops in the temperature of the assembled battery 41 can be suppressed by supplying air from the vehicle cabin to the assembled battery 41, via the intake duct 10. In an environment that causes the temperature of the assembled battery 41 to drop, it is likely that, on account of the air conditioning system for example, the temperature of the air in the vehicle cabin is at a higher temperature than the temperature of the assembled battery 41. Accordingly, drops in the temperature of the assembled battery 41 can be suppressed by supplying air from the vehicle cabin to the assembled battery 41.

The air that is supplied to the assembled battery 41 (unit cells) comes into contact with the assembled battery 41. As a result, the air exchanges heat with the assembled battery 41. If air (air for cooling) at a lower temperature than the temperature of the assembled battery 41 can be brought into contact with the assembled battery 41, then the assembled battery 41 can be cooled through exchange of heat between the assembled battery 41 and that air. If air (air for warming) at a higher temperature than the temperature of the assembled battery 41 is brought into contact with the assembled battery 41, then the assembled battery 41 can be warmed through exchange of heat between the assembled battery 41 and that air.

The input-output characteristic of the assembled battery 41 varies in accordance with the temperature of the assembled battery 41. Input-output (electric power) of the assembled battery 41 is limited in order to suppress, for example, overheating of the assembled battery 41 when the temperature of the assembled battery 41 rises. Input-output of the assembled battery 41 can be secured in this case through cooling of the assembled battery 41.

Securing the input-output (electric power) of the assembled battery 41 may become more difficult when the temperature of the assembled battery 41 drops. In this case, input-output of the assembled battery 41 can be secured through warming of the assembled battery 41. Thus, the assembled battery 41 can be used, without drops of the input-output thereof, by maintaining the temperature of the assembled battery 41 within a predefined temperature range.

A temperature sensor 43 is provided in the battery pack 40. The temperature sensor 43 detects the temperature of the assembled battery 41, and outputs the detection result to the controller 60. The number of temperature sensors 43 can be set as appropriate. The temperature at a plurality of dissimilar sites in the assembled battery 41 can be detected by using a plurality of temperature sensors 43. The controller 60 can control the driving of the fan 30 on the basis of the detection result of the temperature sensor 43.

For example, the controller 60 drives the fan 30 when the temperature of the assembled battery 41 rises, so that, as a result, air from the vehicle cabin (air for cooling) can be supplied to the assembled battery 41. Further, the controller 60 drives the fan 30 when the temperature of the assembled battery 41 drops, so that, as a result, air from the vehicle cabin (air for warming) can be supplied to the assembled battery 41.

More air can be supplied to the assembled battery 41 by increasing the driving amount of the fan 30 i.e. by increasing the revolutions of the fan 30. As a result, the ability to regulate the temperature of the assembled battery 41 can be enhanced. A rotation sensor 31 detects the revolutions of the fan 30 and outputs the detection result to the controller 60.

The controller 60 can calculate the amount of air supplied to the assembled battery 41 on the basis of the detection result of the rotation sensor 31. That is, the amount (total amount) of air supplied during driving of the fan 30 can be calculated by calculating beforehand the supply amount or air over a predefined number of revolutions of the fan 30, and by detecting the revolutions of the fan 30.

The movement speed of air that passes through the intake port 11 becomes higher, and the amount of air supplied to the assembled battery 41 becomes likewise greater. As a result, the revolutions of the fan 30 also increase within a predefined lapse of time. Conversely, the movement speed of air that passes through the intake port 11 decreases, and the amount of air supplied to the assembled battery 41 decreases likewise. As a result, the revolutions of the fan 30 also decrease within a predefined lapse of time.

A discharge duct 50 is connected to the case 42 of the battery pack 40. Air that having exchanged heat with the assembled battery 41 moves towards the discharge duct 50. A discharge port 51 is provided in the discharge duct 50. Air moving through the discharge duct 50 is discharged out through the discharge port 51. The air discharged through the discharge port 51 can be returned to the vehicle cabin, or can be led to a space (for example, luggage room) of the vehicle other than the vehicle cabin (space boarded by the occupant). The air discharged through the discharge port 51 can also be led out of the vehicle.

Figure 6:
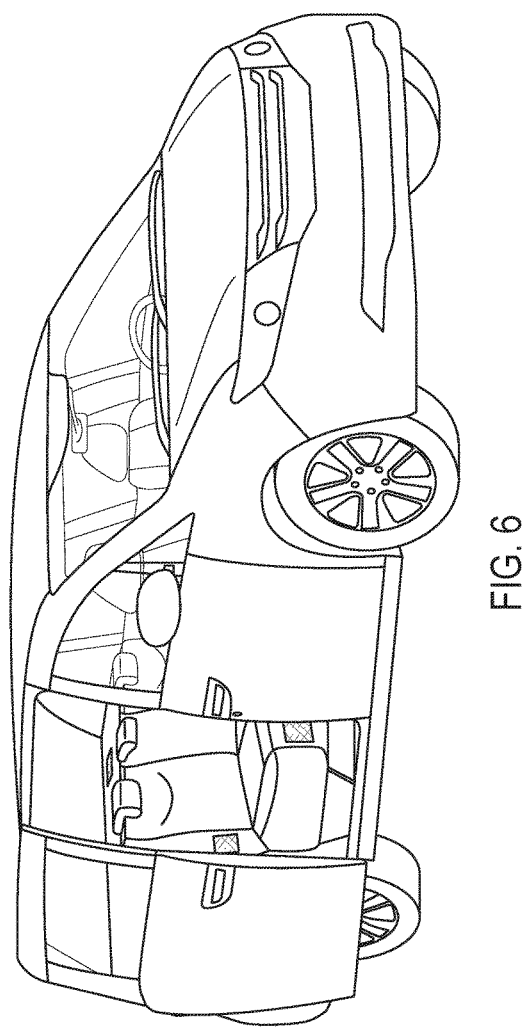
FIG. 6 is a schematic diagram illustrating a configuration of an exemplary embodiment of regulating the temperature of a battery pack in which the door is opened.

A door opening-closing switch 70 detects the open-close state of a door that is provided in the vehicle. In the present embodiment, the door is a door (so-called front door and rear door) that is opened and closed when the occupant boards or leaves the vehicle. For example, the door opening-closing switch 70 is on when the door is in an open state, and off when the door is in a closed state. When the door is opened, as illustrated in FIG. 6, air is allowed to move between the vehicle cabin and the exterior of the vehicle (that is, the vehicle is brought to a state in which air is allowed to flow into and flow out of the vehicle).

The controller 60 determines whether the door is in open state or closed states on the basis of the on/off state of the door opening-closing switch 70. The door opening-closing switches 70 are provided as many as the number of doors. In this embodiment, each door opening-closing switch 70 is corresponding to each door respectively. Thus, the controller 60 can determine the open-close state of each door on the basis of the output of the door opening-closing switch 70 respectively.

The controller 60 has a memory 61 and a counter 62. The memory 61 stores information that is used when the controller 60 executes a predefined process (in particular, the process explained in the present embodiment). The counter 62 counts the number of times that the door is opened and closed, on the basis of the outputs of the door opening-closing switch 70. Specifically, the controller 60 increments a count value of the counter 62 whenever the door is opened and closed. The door is opened and closed whenever the occupant boards or alights. Accordingly, the boarding frequency of the occupant (corresponding to the number of times that air is in a moving state) can be acquired by counting the number of times that the door is opened and closed.

A display (corresponding to an information output unit) 80 is used in order to display specific information. For example, the display 80 can display information relating to travel of the vehicle. Information relating to travel of the vehicle includes, for example, the travel speed of the vehicle, the travel distance, engine revolutions and the like.

In the present embodiment, the fan 30 is disposed in the intake duct 10, but the invention is not limited thereto. Specifically, it suffices that air can be taken in through the intake port 11, through driving of the fan 30. For example, air can be taken in through the intake port 11, through driving of the fan 30, also in a case where the fan 30 is disposed in the discharge duct 50.

Figure 2:
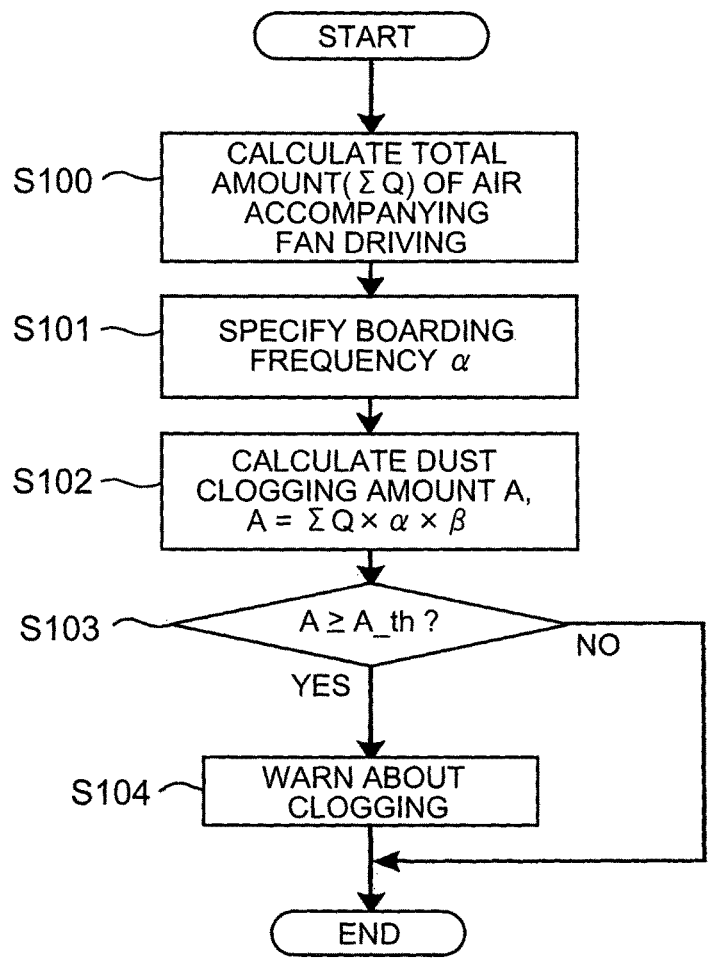
FIG. 2 is a flowchart illustrating a process of estimating a dust clogging amount according to the above embodiment.

In the present embodiment, the dust clogging amount on the filter 20 is estimated on the basis of the supply amount of air that accompanies driving of the fan 30. This estimation process will be explained based on the flowchart of FIG. 2. The process illustrated in FIG. 2 is executed by the controller 60.

In step S100, the controller 60 calculates a total amount $\Sigma Q$ of air that is supplied to the battery pack 40 during driving of the fan 30. Specifically, the controller 60 calculates the amount of air that is supplied to the battery pack 40 over the period from start of driving of the fan 30 until driving of the fan 30 is discontinued. As described above, the controller 60 can calculate the amount of air supplied to the assembled battery 40 on the basis of the detection result of the rotation sensor 31.

The total amount $\Sigma Q$ of air is the amount of air that is supplied to the battery pack 40 over the period from the point in time at which the fan 30 is driven for the first time until the present. The fan 30 may be driven intermittently in accordance with the temperature of the battery pack 40 (assembled battery 41) and in accordance with the on/off status of the ignition switch of the vehicle.

That is, the fan 30 may not be driven until the temperature of the assembled battery 41 reaches an upper-limit temperature or a lower-limit temperature that are determined beforehand. The fan 30 starts being driven when the temperature of the assembled battery 41 reaches the upper-limit temperature or the lower-limit temperature. Driving of the fan 30 may be discontinued when the ignition switch of the vehicle is off. Driving of the fan 30 may be initiated when the ignition switch is on.

Every time that the fan 30 is driven, the controller 60 calculates the amount of air that is supplied during driving of the fan 30. The controller 60 can calculate the total amount $\Sigma Q$ by integrating the amount of air that is supplied during driving of the fan 30.

In step S101, the controller 60 specifies a boarding frequency $\alpha$ on the basis of the count value of the counter 62. The boarding frequency $\alpha$ is a value (equal to or greater than 1) that denotes the frequency with which the occupant boards or leaves the vehicle, and changes in accordance with the count value of the counter 62. Air is allowed to move between the vehicle cabin and the vehicle exterior when the occupant boards or leaves the vehicle.

Figure 3:
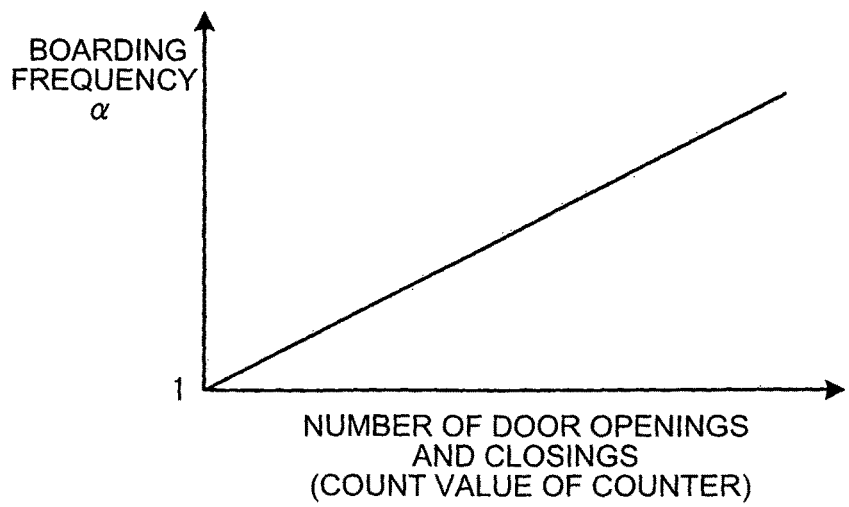
FIG. 3 is a diagram illustrating a relationship between boarding frequency and number of openings and closings of a door, according to the above embodiment.

In the present embodiment, a map that denotes the relationship between the count value of the counter 62 and the boarding frequency $\alpha$, as illustrated in FIG. 3, is set beforehand. The boarding frequency $\alpha$ can be specified on the basis of this map. As illustrated in FIG. 3, the boarding frequency $\alpha$ increases as the count value of the counter 62 becomes greater. The map illustrated in FIG. 3 can be stored in the memory 61. The controller 60 can specify the boarding frequency $\alpha$ corresponding to the current count value of the counter 62 by using the map illustrated in FIG. 3.

The map illustrated in FIG. 3 is used in the present embodiment, but the invention is not limited thereto. Specifically, it suffices that the boarding frequency $\alpha$ can be derived from the count value of the counter 62. For example, the boarding frequency $\alpha$ can be calculated by determining beforehand an arithmetic expression that denotes the relationship between the count value of the counter 62 and the boarding frequency $\alpha$, and by inputting then the count value of the counter 62 into the arithmetic expression.

In step S102, the controller 60 calculates the dust clogging amount on the filter 20. Specifically, the controller 60 calculates the dust clogging amount on the filter 20 on the basis of Expression (1) below.

$$A = \Sigma Q \times \alpha \times \beta \tag{1}$$

In Expression (1), A is the dust clogging amount on the filter 20. Further, $\Sigma Q$ is the total amount of air that is supplied to the battery pack 40, and is a value calculated in the process of step S100. Further, $\alpha$ is the boarding frequency, for which there is used the value specified in the process of step S101, and $\beta$ is a coefficient that takes on a value greater than 0.

The coefficient $\beta$ is a value established beforehand on the basis of a relationship between the position of a door and the position of the intake port 11. The position relationship between the door and the intake port 11 is determined beforehand in accordance with the vehicle, and hence the coefficient $\beta$ can be set on the basis of a positional relationship between the door and the intake port 11. Information relating to the coefficient $\beta$ can be stored in the memory 61. A method for determining the coefficient $\beta$ will be explained next with reference to FIG. 4.

Figure 4:
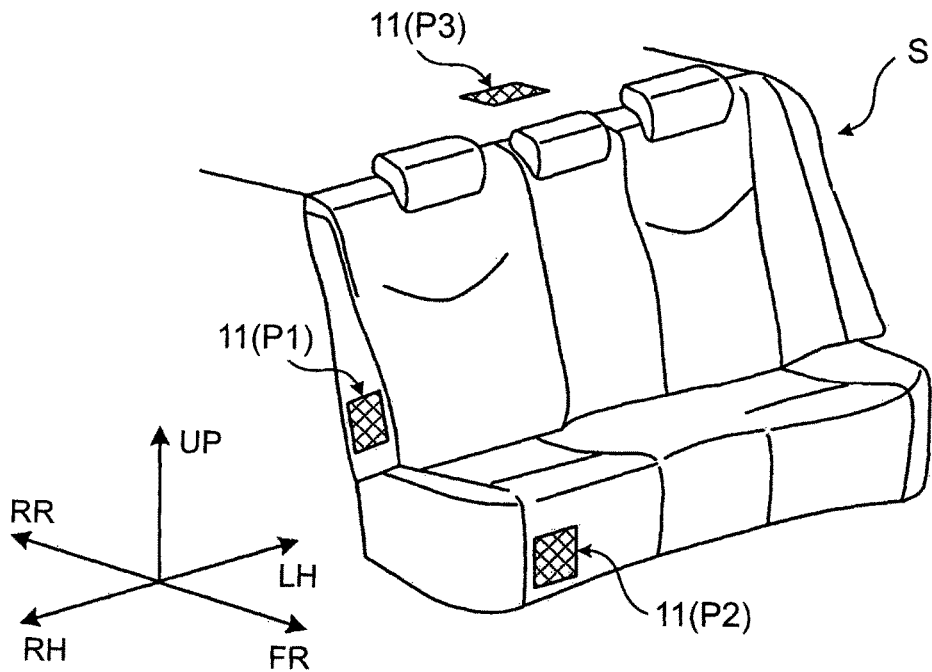
FIG. 4 is a diagram for explaining the value of a coefficient P corresponding to the position of an intake port, according to the above embodiment.

Upon intake of air from the vehicle cabin through the intake port 11, the intake port 11 can be provided at various positions. FIG. 4 illustrates (examples of) three positions at which the intake port 11 can be provided. FIG. 4 illustrates the intake port 11 disposed around a seat (rear seat) S. At least one intake port 11 can be actually provided, from among the three intake ports 11 illustrated in FIG. 4.

In FIG. 4, the arrow FR denotes the direction of forward motion of the vehicle, and the arrow RR denotes the direction of reverse motion of the vehicle. The arrow UP denotes a vertically upward direction of the vehicle. The arrow LH denotes a leftward direction at a time where the vehicle points in the forward direction (direction of the arrow FR), and the arrow RH denotes a rightward direction at a time where the vehicle points in the forward direction (direction of the arrow FR).

In FIG. 4, the intake port 11 at position P1 is provided at a position adjacent to the seat S (specifically, the seat back), in the left-right direction of the vehicle (direction of arrows LH, RH). The intake port 11 at position P1 is positioned between the seat S and a door (so-called rear door, not shown). The door is positioned in the direction of arrow RH with respect to the seat S. In FIG. 4, the intake port 11 is provided at position P1, on the side of the arrow RH, with respect to the seat S, but the intake port 11 can also be provided on at a position on the side of the arrow LH with respect to the seat S. That is, the intake port 11 can be provided on both sides of the seat S in the left-right direction of the vehicle.

The intake port 11 at position P2 is provided at the bottom of the seat S. The intake port 11 at position P2 is spaced further apart from the door (rear door), which is positioned in the direction of arrow RH with respect to the seat S, than the intake port 11 at position P1. The intake port 11 at position P3 is provided further towards the rear of the vehicle (direction of arrow RR) than the seat S (specifically, the headrest). The intake port 11 at position P3 is spaced further apart from the door (rear door), which is positioned in the direction of arrow RH with respect to the seat S, than the intake port 11 at position P2.

The ease with which dust gets into the intake port 11 can differ in accordance with the positions P1 to P3 of the intake port 11, and hence the coefficient $\beta$ can be modified in accordance with the positions P1 to P3 of the intake port 11.

For example, the position of the intake port 11 is higher with respect to the height direction of the vehicle, the coefficient $\beta$ can be smaller. In other words, if the position of the intake port 11 is lower, readily dust gets into the intake port 11 more. Accordingly, the coefficient $\beta$ can be increased.

Also, the closer the intake port 11 is to the door, the more readily dust gets into the intake port 11 accompanying opening and closing of the door. Therefore, the closer the intake port 11 stands to the door, the greater the coefficient $\beta$ that can be set. In other words, the further away the intake port 11 is from the door, the smaller the coefficient $\beta$ that can be set.

The process of step S101 takes into account the number of openings and closings of the door that is disposed at a position at which dust gets readily into the intake port 11, when the boarding frequency $\alpha$ is specified. For example, when the intake port 11 is provided at position P1, as illustrated in FIG. 4, the number of opening and closing of the door (rear door) that is positioned in the direction of arrow RH with respect to the seat S, is counted. Then, the boarding frequency $\alpha$ corresponding to this count value can be specified. The number of opening and closing of a door that is most readily affected by intrusion of dust into the intake port intake port 11 can also be taken into account of for the intake port 11 at positions P2 and P3.

Thus, the coefficient $\beta$ corresponding to the actual position of the intake port 11 in the vehicle can be specified if there is preset the coefficient $\beta$ for positions P1 to P3 of the intake port 11. Positions P1 to P3 of the intake port 11 illustrated in FIG. 4 are examples, and the intake port 11 may be provided at positions other than positions P1 to P3. In such a case as well, the coefficient $\beta$ can be preset on the basis of the likelihood of dust intrusion.

In FIG. 4, an example has been explained wherein the intake port 11 is provided around the rear seat S, but the invention is not limited thereto. That is, the invention can be used so long as the intake port 11 is provided in the vehicle cabin. For example, the invention can be used also in a configuration wherein the intake port 11 is provided around a front seat that is disposed further towards the front of the vehicle than the rear seat S.

In step S103, the controller 60 determines whether or not the dust clogging amount A that is calculated in the process of step S102 is equal to or greater than a threshold value A_th. The threshold value A_th is an upper-limit value of the allowable amount of dust clogging on the filter 20. The threshold value A_th can be preset in consideration of the capability of air taken in through the intake port 11 to regulate the temperature of the assembled battery 41.

The air that is taken in through the intake port 11 is supplied less readily to the battery pack 40 as the dust clogging amount A increases. The temperature of the battery pack 40 becomes more difficult to regulate as air is supplied less readily to the battery pack 40. The threshold value A_th can be preset in view of the above circumstances. Information relating to the threshold value A_th can be stored in the memory 61.

Figure 5:
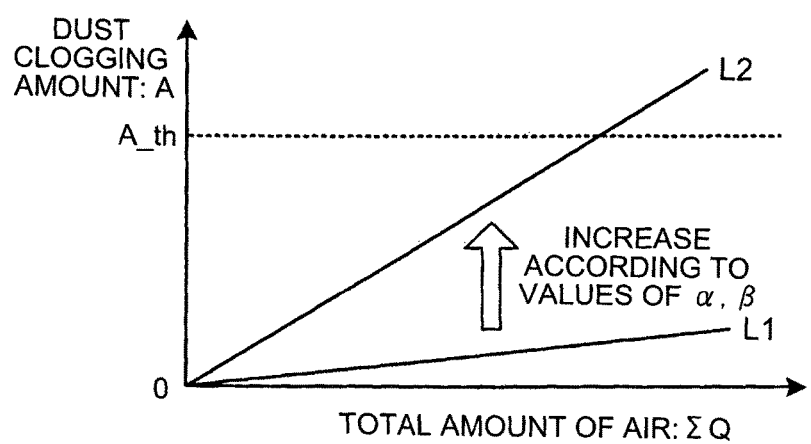
FIG. 5 is a diagram illustrating a relationship between the total amount of air and a dust clogging amount according to the above embodiment.

As illustrated in FIG. 5, the dust clogging amount A increases as the total amount $\Sigma Q$ of air becomes greater. Specifically, dust adheres more readily to the filter 20 as more air is taken in through the intake port 11. Accordingly, the dust clogging amount A increases as the total amount $\Sigma Q$ of air becomes greater.

The dust clogging amount A varies depending on the boarding frequency $\alpha$ and the coefficient $\beta$. Specifically, the dust clogging amount A increases as at least one from among the boarding frequency $\alpha$ and the coefficient $\beta$ becomes greater. That is, the dust clogging amount A reaches more readily the threshold value A_th as the boarding frequency $\alpha$ and/or the coefficient $\beta$ increases, as illustrated in FIG. 5. The coefficient $\beta$ is a preset value, and hence the dust clogging amount A increases depending on the total amount ΣQ of air and the boarding frequency α.

In FIG. 5, L1 denotes the behavior of the dust clogging amount A in a case where the boarding frequency α is comparatively low. For instance, in a case where the intake port 11 is provided around the rear seat S, as illustrated in FIG. 4, and the number of opening and closing of the door (rear door) is counted, the dust clogging amount A does not increase only readily upon opening and closing of a door (so-called front door) that is adjacent to the driver seat. In this case, the dust clogging amount A depends mainly on the total amount ΣQ of air.

In FIG. 5, L2 denotes the behavior of the dust clogging amount A in a case where the boarding frequency α is comparatively high. For example, in a case where the intake port 11 is provided around the rear seat S, as illustrated in FIG. 4, and there is counted the number of opening and closing of a door (rear door) that is adjacent to the rear seat S in the left-right direction of the vehicle (direction of arrows LH, RH), the boarding frequency α increases readily as the rear door is opened and closed frequently. In this case, the dust clogging amount A depends on the total amount ΣQ of air and the boarding frequency α.

When the dust clogging amount A is equal to or greater than the threshold value A_th, the controller 60 determines that the temperature regulation ability of the battery pack 40 is insufficient due to clogging of the filter 20 with dust (YES in step S103), and the controller 60 moves on to the process of step S104. By contrast, when the dust clogging amount A is smaller than the threshold value A_th, the controller 60 determines that the temperature regulation ability of the battery pack 40 is preserved (NO in step S103), and ends the process illustrated in FIG. 2.

In step S104, the controller 60 inform the user or the like that the filter 20 is clogged with dust. Specifically, the controller 60 displays, on the display 80, information that denotes that the filter 20 is clogged with dust. The user or the like can become aware of clogging of the filter 20 with dust by checking the display of the display 80.

In the present embodiment, information about clogging of the filter 20 with dust is performed by way of the display 80, but the invention is not limited thereto. Specifically, it suffices that the user or the like can become aware of clogging of the filter 20 with dust; for example, the user or the like can be informed about clogging of the filter 20 with dust through output of sound from a speaker (corresponding to an information output unit).

The user, dealer or the like removes dust from the filter 20 after having being informed about clogging of the filter 20 with dust. Herein, removal of dust from the filter 20 involves not only shaking off dust adhered to the filter, but encompasses also replacement of the filter 20 by a new filter 20 having no dust adhered thereto.

Once dust is removed from the filter 20, the controller 60 resets to zero the total amount ΣQ of air that is used in the process of step S100. Upon removal of dust from the filter 20, the controller 60 can reset to zero the total amount ΣQ of air if information that denotes that dust has been removed is inputted to the controller 60. As a result, the controller 60 starts to integrate the supply amount of air in step S100 from the point in time after removal of dust off the filter 20.

In the present embodiment, the state of dust clogging of the filter 20 can be estimated on the basis of the supply amount of air (total amount ΣQ) to the battery pack 40. The state of dust clogging on the filter 20 can be estimated taking into consideration not only the supply amount of air (total amount ΣQ), but also the frequency with which the occupant boards or leaves the vehicle (boarding frequency α) and the positional relationship of the intake port 11 (coefficient β).

The warning about dust clogging of the filter 20 can be issued before a drop in the temperature regulation ability of the battery pack 40, depending on the value of the threshold value A_th. This allows removing dust from the filter 20, and allows suppressing drops in the temperature regulation ability of the battery pack 40.

In the present embodiment, the total amount ΣQ of air, the boarding frequency α and the coefficient β are taken into account upon estimation of the dust clogging amount A, but the invention is not limited thereto. That is, the dust clogging amount A can be estimated taking only the total amount ΣQ of air into consideration.

Figure 7:
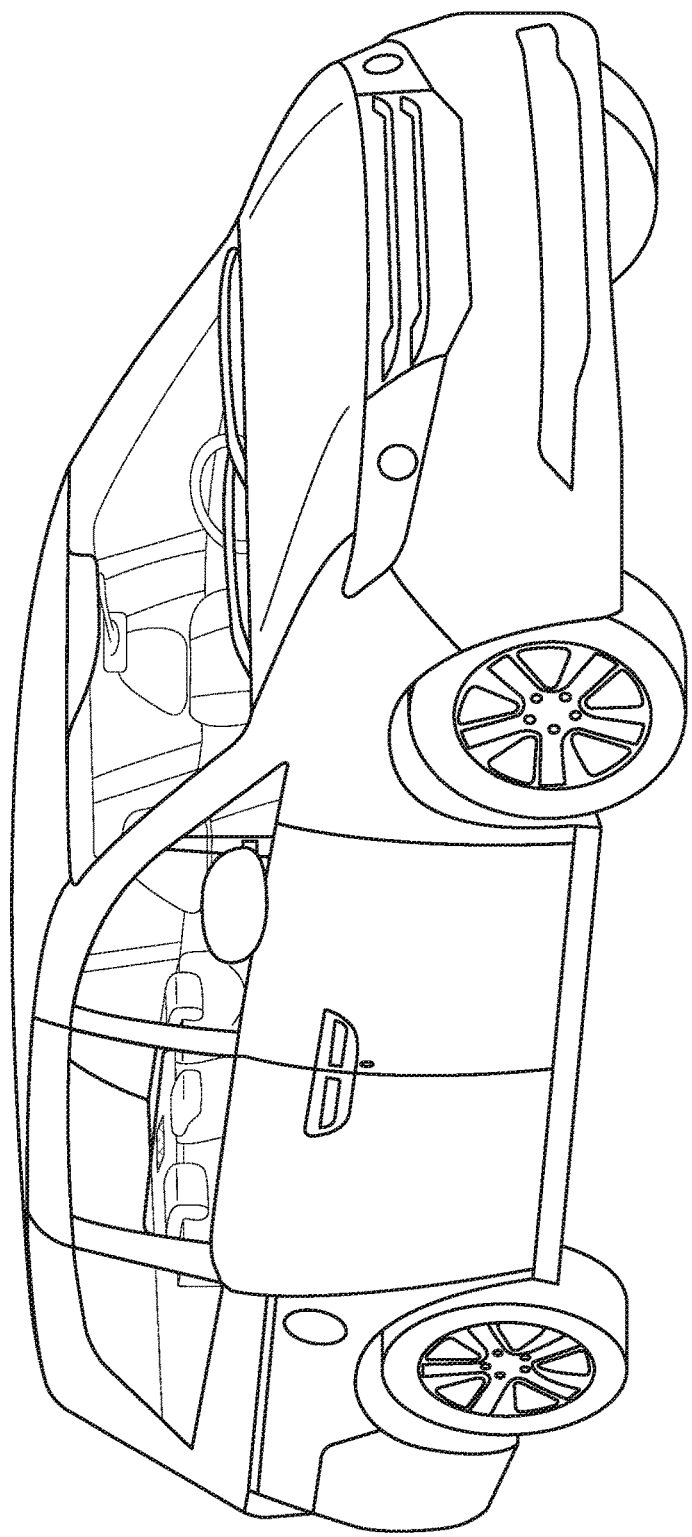
FIG. 7 is a schematic diagram illustrating a configuration of an exemplary embodiment of regulating the temperature of a battery pack in which a rear window is in a lowered position.

Not only the boarding frequency α and the coefficient β but also other factors can be taken into account, for example the time during which the door is open, the open-close state of a window, as illustrated in FIG. 7, and humidity of air. At least one factor of dust clogging other than the total amount ΣQ of air can be taken into consideration.

Dust may penetrate more readily into the intake port 11 as the time during which the door is open becomes longer. In this case, the dust clogging amount A may be set to increase as the time during which the door is open becomes longer. The door referred to herein is the door the number of opening and closing whereof is counted upon specification of the boarding frequency α.

Specifically, the dust clogging amount A can be calculated by specifying a coefficient γ1 that corresponds to the open time of the door, and by multiplying the total amount ΣQ of air by the coefficient γ1. The coefficient γ1 that corresponds to the open time of the door can be specified if there is a preset correspondence relationship between the coefficient γ1 and door open time. As described above, the open state of the door can be detected by the door opening-closing switch 70. The time during which the door remains in an open state can be measured using a timer.

Dust may penetrate more readily into the intake port 11 as the number of times that the window is opened becomes greater, or as the time during which the window is open becomes longer. The window herein denotes the window of the detector the number of openings and closings whereof is counted when the boarding frequency α is specified. Air is allowed to move between the vehicle cabin and the vehicle exterior when the window is open.

Given the above considerations, the estimated dust clogging amount A may be set to increase as the number of times that the window is opened becomes greater, or as the time during which the window is open becomes longer. Whether or not the window is open can be determined on the basis of the operational state of a switch that instructs opening and closing of the window.

Specifically, the dust clogging amount A can be calculated by specifying a coefficient γ2 that corresponds to the number of times that the window is opened, and by multiplying the total amount ΣQ of air by the coefficient γ2. The coefficient γ2 that corresponds to the number of times that the window is opened can be specified if there is a preset correspondence relationship between coefficient γ2 and the number of times that the window is opened. The open time of the window can also be taken into consideration when specifying the coefficient γ2. The window open time can be measured using a timer.

Dust adheres more readily to the filter 20 as the humidity of the air increases. Therefore the estimated dust clogging amount A may be set to increase as the humidity becomes higher. The humidity of air can be detected using a humidity sensor.

Specifically, the dust clogging amount A can be calculated by detecting the humidity of air and by multiplying the total amount ΣQ of air by a coefficient γ3 that corresponds to the detected humidity. The coefficient γ3 corresponding to the detected humidity can be specified if there is a preset correspondence relationship between detected humidity and the coefficient γ3.

Dust may penetrate more readily into the intake port 11 as the number of occupants increases. Specifically, dust swirls more readily and gets more readily into the intake port 11 as the number of occupants that board or leave the vehicle becomes greater. In this case, the dust clogging amount A may be set to increase as the number of occupants increases. The number of occupants can be grasped by using seat sensors that are provided in the seats on which the occupants sit.

Specifically, the dust clogging amount A can be calculated by specifying a coefficient γ4 that corresponds to the number of occupants, and by multiplying the total amount ΣQ of air by the coefficient γ4. The coefficient γ4 that corresponds to the number of occupants can be specified if there is a preset correspondence relationship between the number of occupants and the coefficient γ4.

The dust clogging amount A may be calculated by taking into consideration the temperature environment in which the vehicle of the present embodiment is used. An occupant is likely to wear light clothing in a high-temperature environment, and warm clothing in a low-temperature environment. Dust (for example lint) may occur more readily in the case of warm clothing than in the case of light clothing. Accordingly, the estimated dust clogging amount A may be set to increase with decreasing temperature of the environment in which the vehicle is used.

Specifically, the dust clogging amount A can be calculated by specifying a temperature environment in which the vehicle is used, and by multiplying the total amount ΣQ of air by a coefficient γ5 corresponding to this temperature environment. The coefficient γ5 corresponding to the temperature environment can be specified if there is a preset correspondence relationship between the temperature environment and the coefficient γ5. The temperature environment in which the vehicle is used can be detected using a temperature sensor that is installed in the vehicle.

In the present embodiment, air that is present in the space (vehicle cabin) that is boarded by the occupant is taken in through the intake port 11, but the invention is not limited thereto. For example, the invention can be used also in a configuration wherein air that is present in the luggage space (corresponding to the vehicle interior) is taken in through the intake port 11. The luggage space may be separated from the vehicle cabin, or may communicate with the vehicle cabin. In the latter case, a frequency corresponding to the number of opening and closing of a trunk lid or rear hatch can be used instead of the boarding frequency α.

Dust may be taken in through the intake port 11 whenever the trunk lid or rear hatch is opened and closed. Therefore, the dust clogging amount A can be calculated by taking into consideration the number of openings and closings of the trunk lid or rear hatch. In this case, the estimated dust clogging amount A may be set to increase as there increases the number of openings and closings of the trunk lid or rear hatch, as in the case of the boarding frequency α explained in the present embodiment.

The invention claimed is:

1. A temperature regulation system comprising:
    an electric storage device installed in a vehicle to perform charge and discharge;
    an intake duct leading air of a vehicle interior to the electric storage device from an intake port;
    a fan that causes the air to be taken into the intake duct;
    a filter provided inside the intake duct that traps foreign matter; and
    a controller configured to estimate a clogging amount of the foreign matter on the filter,
    the controller being configured to increase the estimated clogging amount as a total amount of the air that is supplied to the electric storage device accompanying driving of the fan increases and the number of times that the vehicle is brought to a state in which air is allowed to flow into and flow out of the vehicle,
    wherein the number of times that the vehicle is brought to the state in which air is allowed to flow into and flow out of the vehicle; is the number of times that a door of the vehicle is opened and closed, and
    wherein the controller is configured to calculate a total amount of the air by integrating the amount of the air supplied to the electric storage device over the time that the fan is driven.

2. A temperature regulation system comprising:
    an electric storage device installed in a vehicle and that performs charge and discharge;
    an intake duct leading air of a vehicle interior to the electric storage device from an intake port;
    a fan that causes the air to be taken into the intake duct;
    a filter provided inside the intake duct that traps foreign matter; and
    a controller configured to estimate a clogging amount of the foreign matter on the filter,
    the controller being configured to increase the estimated clogging amount as a total amount of the air that is supplied to the electric storage device accompanying driving of the fan increases and the number of times that the vehicle is brought to a state in which air is allowed to flow into and flow out of the vehicle,
    wherein the number of times that the vehicle is brought to the state in which air is allowed to flow into and flow out of the vehicle is the number of times that a window of the vehicle is opened and closed, and
    wherein the controller is configured to calculate a total amount of the air by integrating the amount of the air supplied to the electric storage device over the time that the fan is driven.

3. The temperature regulation system according to claim 1, wherein
    the controller calculates the estimated clogging amount by multiplying the total amount of the air by a coefficient, the coefficient varying depending on a position of the intake port in the vehicle interior.

4. The temperature regulation system according to claim 1, further comprising:
    an information output unit configured to output information indicating that the filter is clogged with the foreign matter, wherein
    the controller drives the information output unit when the clogging amount is equal to or greater than a threshold value.

5. A method for estimating a foreign matter clogging amount, comprising:

leading air in a vehicle, through driving of a fan, to an electric storage device via an intake duct in which a filter is disposed;

estimating a clogging amount of foreign matter on the filter; and increasing the estimated clogging amount as total amount of the air that is supplied to the electric storage device increases and the number of times that the vehicle is brought to a state in which air is allowed to flow into and flow out of the vehicle, wherein the number of times that the vehicle is brought to the state in which air is allowed to flow into and flow out of the vehicle, is the number of times that a door of the vehicle is opened and closed, and wherein the controller is configured to calculate a total amount of the air by integrating the amount of the air supplied to the electric storage device over the time that the fan is driven.

6. A method for estimating a foreign matter clogging amount, comprising:

leading air in a vehicle, through driving of a fan, to an electric storage device via an intake duct in which a filter is disposed;

estimating a clogging amount of foreign matter on the filter; and increasing the estimated clogging amount as a total amount of the air that is supplied to the electric storage device increases and the number of times that the vehicle is brought to a state in which air is allowed to flow into and flow out of the vehicle, wherein the number of times that the vehicle is brought to the state in which air is allowed to flow into and flow out of the vehicle is the number of times that a window of the vehicle is opened and closed, and wherein the controller is configured to calculate a total amount of the air by integrating the amount of the air supplied to the electric storage device over the time that the fan is driven.

7. The temperature regulation system according to claim 2, wherein the controller calculates the estimated clogging amount by multiplying the total amount of the air by a coefficient, the coefficient varying depending on a position of the intake port in the vehicle interior.

8. The temperature regulation system according to claim 2, further comprising:

an information output unit configured to output information indicating that the filter is clogged with the foreign matter, wherein the controller drives the information output unit when the clogging amount is equal to or greater than a threshold value.

* * * * *